United States Patent
Farque

[15] 3,679,957
[45] July 25, 1972

[54] CHOPPER CIRCUIT FOR USE IN AN A.C. SERVO AMPLIFIER

[72] Inventor: C. Anthony Farque, Fayetteville, Ark.

[73] Assignees: Ray H. Wilburn, Tulsa, Okla.; W. E. Maldonado, Lansing, Mich.

[22] Filed: Feb. 26, 1970

[21] Appl. No.: 14,516

[52] U.S. Cl.............................318/684, 318/629, 318/681
[51] Int. Cl. .................................................... G05b 11/12
[58] Field of Search.................318/629, 632, 635, 678, 681, 318/684

[56] References Cited

UNITED STATES PATENTS

| | | | |
|---|---|---|---|
| 2,506,531 | 5/1950 | Wild | 318/684 |
| 2,951,974 | 9/1960 | Silver | 318/629 |
| 2,475,576 | 7/1949 | Wild et al. | 318/629 |

Primary Examiner—T. E. Lynch
Attorney—Head & Johnson

[57] ABSTRACT

This invention relates to a control circuit for driving a servomotor. More particularly, the invention relates to a circuit for controlling a servomotor including a chopper circuit providing a regularly reoccurring square wave signal of constant frequency and selectable voltage levels having a spike voltage signal superimposed thereon, a time complement spike signal generating circuit means providing spike voltage signals of equivalent amplitude in opposite polarity, means of summing said chopper circuit square wave voltage signal and said time complement spike voltage signal to provide a chopper square wave voltage signal output substantially free of spike components which are fed to an amplifier and thence to a motor drive circuit means for communicating the spike-free square wave control voltage signals to a servomotor.

3 Claims, 2 Drawing Figures

INVENTOR.
C. ANTHONY FARQUE
BY
Head & Johnson
ATTORNEYS

CHOPPER CIRCUIT FOR USE IN AN A.C. SERVO AMPLIFIER

BACKGROUND AND OBJECTS OF THE INVENTION

Servomotors of the type frequently utilized in industrial and defense related applications require precise control of signal input. Control voltage input amplification cannot be effectively accomplished utilizing direct coupled amplifiers since such amplifiers are incapable of distinguishing between input signal small variations of microvolt magnitude and thermally generated effects internal of the amplifier components. For this reason it has been customary in servo control circuits to utilize chopper arrangements, the variable DC input voltage being broken into a sequence of voltage pulses. In this way the amplitude of the voltage pulses can be increased substantially while maintaining a given torque producing result in the servomotor compared to equivalent torque producing results of a DC voltage system. One means of chopping voltage in servo control systems presently used includes a mechanical chopper comprised essentially of a vibrating reed which swings in response to magnetic attraction. Typically such mechanical choppers include a moving contact point on the end of the reed which swings between two fixed contact points, causing a voltage pulse each time a contact point is physically engaged. In order for the chopper to work satisfactorily it must dwell an even amount of time on each contact. Even when precisely arranged the mechanical chopper devices are difficult to maintain in calibration and are subject to failure due, among other things, to deposits building on the contacts.

This invention provides a solid state servo control system including a chopper circuit portion. An important part of this invention is the provision of a solid state servo control system including a chopper circuit and including means of eliminating spike voltage components characteristically present in solid state voltage chopping devices so as to provide an output for use in driving servomotor in the form of controllable amplitude square wave signals substantially free of transient signal components.

It is therefore an object of this invention to provide an improved control circuit for driving a servomotor. More particularly, an object of this invention is to provide a solid state control circuit for driving a servomotor.

Still more particularly, an object of this invention is to provide a solid state control circuit for driving a servomotor including a chopper circuit, and including means of canceling spike components so as to provide a substantially pure variable amplitude square wave servomotor driving signal.

Another object of this invention is to provide, in a control circuit for driving a servomotor, an improved motor drive stage.

A circuit which fulfills these objectives, as well as other objectives of the invention, will now be set forth in the description and claims, taken in conjunction with the attached drawings.

DESCRIPTION OF THE VIEWS

DETAILED DESCRIPTION

Figure 1:
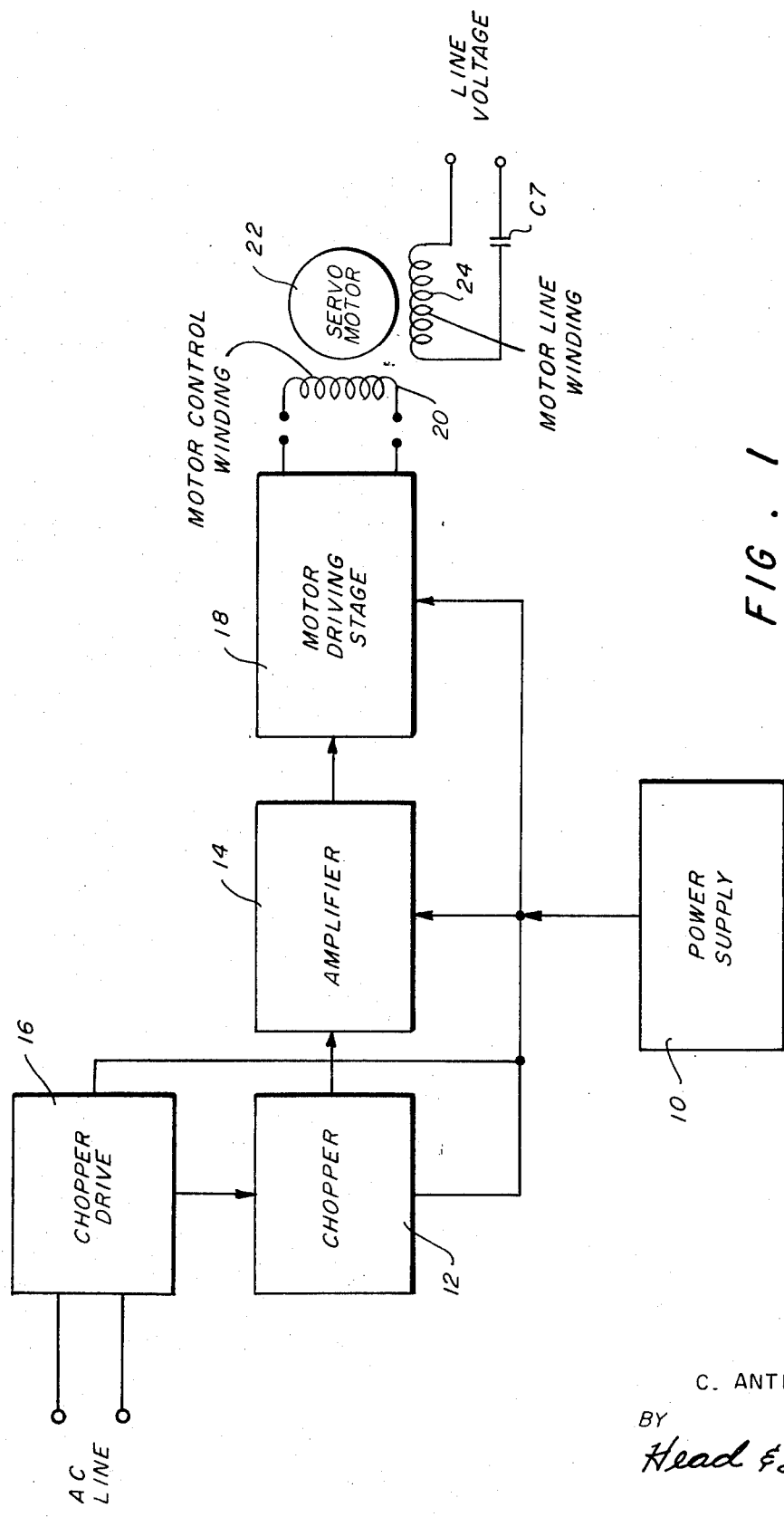
FIG. 1 is a block diagram of a system of this invention for controlling a servomotor.

The control circuit for driving a servomotor described herein is comprised of five basic functional portions as shown in FIG. 1. The power supply 10 converts line voltage to various direct voltages required to power the other circuit portions. The chopper circuit 12 converts microvolt DC voltage into microvolt AC voltage at its output terminal which is then amplified by a capacitor coupled amplifier 14. The chopper 12 is driven by a chopper drive circuit 16 which not only controls chopper 12 to produce a square wave AC voltage output but does so in a unique manner which eliminates spike voltage components in the chopper output. The amplified replica of the chopper output signal is then applied to the input of a motor driving stage 18 which develops a current through the control winding 20 of the servomotor 22. This current generates a torque in the motor armature which drives the load. The servomotor line winding 24 is supplied by AC line voltage.

It is the purpose of the chopper 12 to convert a DC input voltage into an AC square wave. Ideally the chopper functions as a switch which opens and closes in equally time spaced sequence providing a square wave voltage signal output without degeneration of the input voltage magnitude. Any solid state circuit that performs a chopping function, however, contributes several sources of errors to the output voltage as compared to the ideal case. In a simplified chopper circuit utilizing an insulated gate field effect transistor there are several sources of errors internal to the chopper transistor. First, when the transistor is turned off a small leakage current will continue to flow. Second, the transistor is not an ideal switch because there is always some resistance between its drain and source terminals when it is turned on. The third source of signal error is the gate to source capacitance. The first three sources of error, however, are not too important and by proper circuit design the effects thereof may be minimized to the point that the success of the circuit is not impaired.

The fourth source of error, and the major source of error in a field effect transistor chopper circuit, especially for low level chopping, is the gate to drain capacitance. The gate to drain capacitance is the intrinsic interelectrode capacitance of the active device and may not be reduced to zero.

The field effect chopper is made to alternate between its on and off states by driving its gate with a square wave voltage. The gate to drain capacitance is connected to this square wave and to the drain which is the output terminal of the chopper circuit. In the absence of any DC input voltage to the chopper this gate to drain capacitance will couple energy from the square wave chopper drive to the output. This energy results in a voltage spike being generated at the output of each rise and fall of the chopper drive. The magnitude of these spikes are a function of the gate to drain capacitance of the transistor and the rate of voltage change to time and amplitude of the chopper drive. It is not uncommon for these spikes to run several hundred millivolts in amplitude. The area under these spikes is equivalent to an AC input signal. If the integral of the spikes in both directions is not zero the net result is a DC offset that may drive the servomotor even without an actual DC input signal to the chopper.

Figure 2:
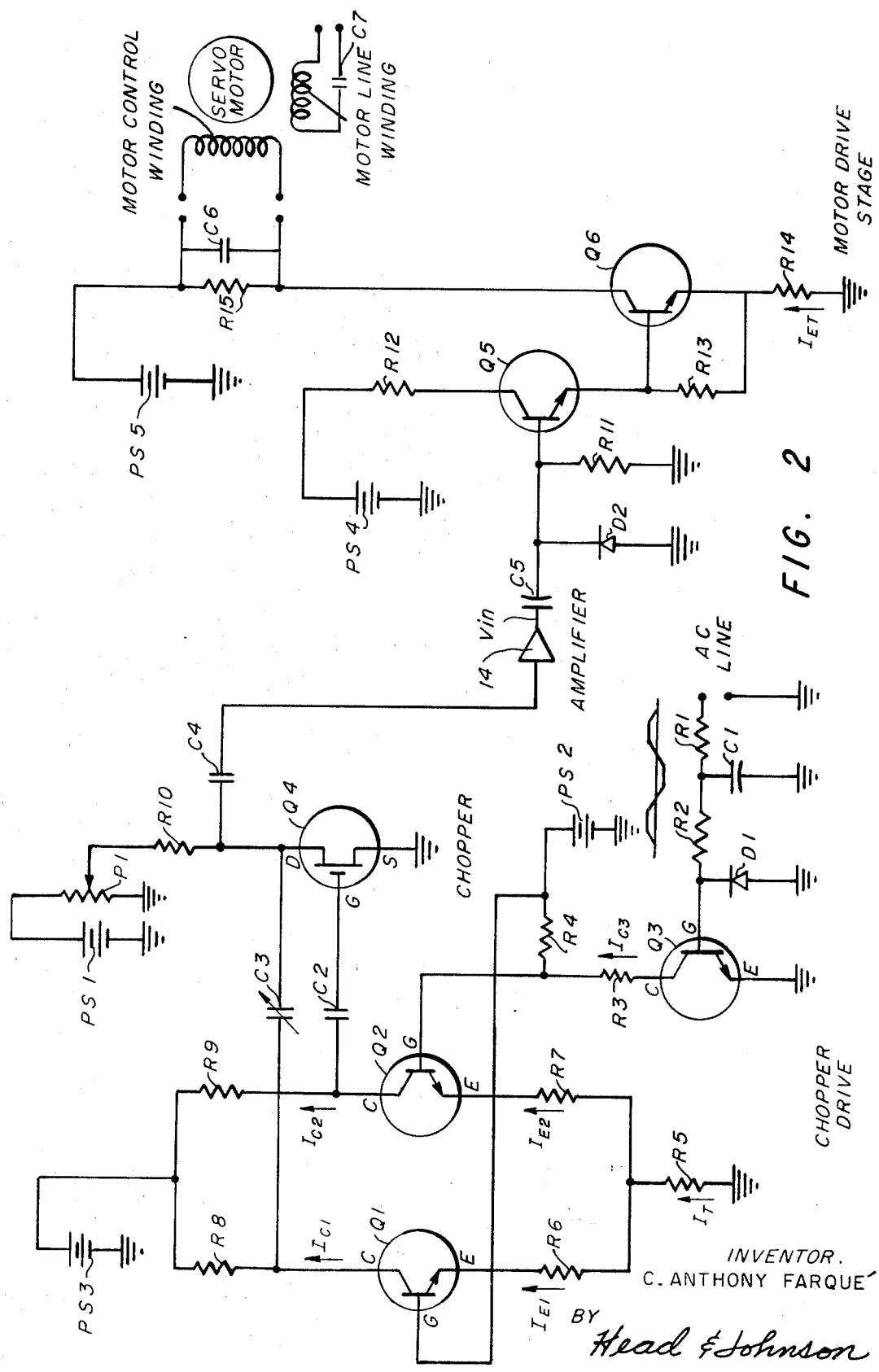
FIG. 2 is a schematic diagram of an embodiment of the servomotor control system of this invention.

In order to both reduce the amplitude of the spikes and to match the negative and positive signal excursions, a modified chopper and drive circuit have been developed as shown in FIG. 2. The chopper is an insulated gate field effect transistor Q4 having a load resistor R10 in the drain circuit connected to a control voltage DC signal supplied by potentiometer P1. A DC power supply source PS1 supplies a constant potential across P1. A square wave driving signal is supplied through capacitor C2 to the gate electrode of transistor Q6 by the chopper drive circuit to be described subsequently. Signal voltage spikes which would normally be produced by Q4 for the reasons above mentioned are suppressed by generally a negative and a positive spike at each rise and fall of the chopper drive and summing them at the drain terminal of the chopper transistor Q4. For a given gate to drain capacitance of transistor Q4 a capacitor C3 equal to the gate to drain capacitance is connected to impart a complement of the chopper drive wave form with the result being that the energy coupled by each capacitance from its respective driving voltage is nearly equal and of opposite polarity to that of the other. This summing is very effective and reduces spiking down into the microvolt level. However, stray capacitances and the fact that the gate to drain capacitance is of a nonlinear voltage sensitive value precludes total cancelation of the spikes. The one stringent requirement made upon the driving circuit supplying the signal to capacitor C3 is that the antispike drive must be an accurate time complement of the chopper drive wave form appearing at capacitor C2. If this is not the case then cancelation cannot take place since the energy introduced by the gate to drain capacitance would not occur simultaneously with the energy introduced by C3 and even if the energies were the same, voltage spikes would appear.

Ordinarily, the chopper drive wave form for a field effect transistor chopper could be developed by utilizing bipolar transistors operating in a saturating logic mode. This arrangement cannot be used successfully to generate true time complementary wave forms because of the inherent storage and delay times of bipolar transistors that are operated in saturation.

A chopper drive circuit which succeeds in providing the required drive signals to capacitors C2 and C3 is shown in FIG. 2. Signal generating transistor Q3 operates as a saturating switch which is driven by a line derived sine wave. Resistor R1 and capacitor C1 comprise a simple hash filter to remove high frequency pertubations from the line input which, for example, may be 12 volts, 60HZ. Resistor R2 is a current limiting resistor which sets a maximum current that may be drawn from C1. The voltage at the base of Q3 is a clipped version of the voltage across C1. A typical wave form being shown above resistor R2. On positive excursions the base of Q3 conducts and clamps the voltage to about +0.5 volts and on negative excursions the transistor is cutoff and diode D1 conducts and clamps the voltage to −0.5 volt. When current is driven into the base of Q3 a collector current also flows through the load resistor R3. This collector current and R3 are selected so that transistor Q3 saturates and has essentially zero volts across its collector-emitter terminals. The collector current is determined primarily by $I_c = (+V_{ref}/R3 + R4)$ where $V_{ref} = PS3$ where resistor R3 is considered to be part of the collector load and Vref is the collector supply PS2. The passage of $I_c$ through R4 generates a voltage which is given by $VR4 = R4 I_c$. When transistor Q3 is cut off during negative excursions of the base driving voltage, the collector current consists of leakage currents and may be considered zero. For this cut off condition of Q3 $I_c$ equals 0, then $V_{R4}$ equals 0 also. It is seen that the voltage across R4 is a square wave that alternates between O and $R4 I_c$.

Square wave generating transistors Q1 and Q2 are connected in the classical differential configuration with R6 = R7 included to force tight matching of the electrical characteristics of Q1 and Q2. An emitter current $I_{ET}$ flows through R5 which divides into $I_{E1}$ and $I_{E2}$ which flow through R6 and R7 respectively. Note that $I_{ET} = I_{E1} + I_{E2}$ for proper non-saturating operation. The magnitude of $I_{ET}$ is determined by $I_{ET} = V_{ref} - V_{BE}/R5 + R6$ and is a constant, where $V_{ref} - PS3$.

If the current gains beta of Q1 and Q2 are reasonably high then the emitter currents of each transistor may be assumed to flow through each transistor and into its respective load resistors R8 and R9, with little error in neglecting the base currents in Q1 and Q2. The voltage drops across these collector resistors R8 and R9 are given by $V_{R8} = I_{C1} R_8$ $V_{R9} = I_{C2} R9$ where $I_{C1} = I_{E1}$ and $I_{C2} = I_{E2}$. Note that the collector voltage swing of each transistor Q1 and Q2 is directly related to its emitter current.

Saturation of a bipolar transistor occurs when both the base emitter and base collector diodes are forward biased. For this condition to occur the collector-emitter voltage of the transistor must be reduced to less than about +0.5 volt. This differential circuit of Q1 and Q2 is designed to insure that the collector-emitter voltage is never less than several volts. The excess electrical charge stored in the forward biased collector base diode of a saturated transistor limits the rate at which the transistor switches from the "on" state (saturation) to the "off" state (cut-off). The above discussion and equations are based on the assumption that Q3 was in cut off with a zero collector current and no voltage across R4. With no voltage across R4 the bases of Q1 and Q2 are seen to be connected to +Vref, that is, the voltage supplied by PS3. This constitutes a balanced condition for which $I_{E1} = I_{E2}$ and $V_{R8} = V_{R9}$. However, if signal generating transistor Q3 were to saturate there would be a voltage across R4 and the base of square wave generating transistor Q1 would be connected to $V_{PS3}$ but the base of Q2 connected to a voltage of $V_{PS3} - V_{R4}$ which unbalances the emitter currents and the corresponding collector voltages of Q1 and Q2. It may be calculated that $$I_{E1} = \frac{+V_{PS3} - I_{ET}R5 - V_{BE}}{R6}$$

$$I_{E2} = \frac{V_{PS3} - I_{ET}R5 - V_{BE} - V_{R4}}{R7}$$

If R8, $I_{E1}$, $R_4$, and $I_{C3}$ are chosen to make $+V_{PS3} - V_{R8} >> +V_{PS3}$ then transistor Q1 will never enter saturation. The collector current of Q1 will alternate between two current levels as the voltage across R4 alternates in a square wave fashion. The two collector currents of Q1 are given by the equations for the emitter currents $I_{E1} = I_{ET} - I_{E2}$ or $I_{E1} = I_{ET}/2$ for the lower current or balanced case and by $I_{E1} = I_{ET} - I_{E2}$ for the higher current or unbalanced case. The currents for Q2 may be calculated similarly.

Using high speed switching transistors designed for non-saturating circuits this chopper drive circuit generates true complementary square waves with rise and fall transitions of each output occurring within a few nanoseconds of one another.

The output of square wave generating transistors Q1 and Q2 are applied by C3 and C2 respectively to the chopper circuit of Q4 and serve to drive Q4 to provide an output square wave signal substantially free of all spike components. The amplitude of the chopper output is determined by P1.

The output of the chopper transistor Q4 is fed by capacitor C4 to a conventional AC coupled amplifier 14 which can provide a voltage gain by way of example, 500,000. The amplified chopper wave form is then applied to the input of the motor driving circuit.

The motor driving circuit has several unique features made possible only by use of the despiking technique described chopper and chopper drive circuits. The input voltage Vin is a square wave from amplifier 14 which forces an AC current through capacitor C5. For negative excursions of Vin diode D2 conducts and transistors Q5 and Q6 are in cut-off. For positive excursions of Vin D1 is back biased and the base emitter junction of Q5 and Q6 are forward biased. The voltage $V_{B5}$ at the base of Q5 is determined by the peak-to-peak voltage of Vin. Voltage $V_{B5}$ sets the emitter current of Q5 and Q6 which is designated as $I_{ET}$. It is this current that is injected into the collector motor control winding 20. Essentially, the motor drive stage is a voltage controlled current source. For convenience the gain beta of Q5 and Q6 is assumed to be high enough so that base currents may be eliminated from the loop equations.

Beginning at the base of Q5, the base voltage $V_{B5}$ is found to be applied between the base of Q5 and ground. An alternate loop is through the base emitter voltage drops of Q5 and Q6 and then through $V_{R14}$, the voltage across R14 developed by the total emitter current $I_{ET}$. Equating these two loops yields:

$V_{B5} = V_{BE5} + V_{BE6} + R13 I_{Et}$

For silicon transistors $V_{BE}$ voltages are approximately + 0.6 volt for linear operation. Incorporating this into the above equation and rewriting gives $V_{B5} - 1.2V = R14 I_{ET}$. For fixed values of $V_{B5}$ and R14 the emitter current of Q6 may be determined by $I_{ET} = V_{B5} - 1.2V/R14$ The collector base junction of bipolar transistors has the characteristics of a current source with regard to the voltage applied between the base and collector. That is, the current passing through a transistor is independent of the load resistance and supply voltage as long as the transistor is operating in a linear manner.

The current $I_{ET}$ is developed according to the above equation and is injected into the collector of Q5 and passes through the control winding 20 of the servomotor 22 and finally to the supply PS5. The resistance of this control winding does not restrict or control the current $I_{ET}$ passing through it. Even if a short circuit were substituted for the control winding the current the transistor collector would remain the same. It is this constant current property that enables the output circuit to be short circuit proof. The servomotor 22 has two windings 20 and 24, one of which is the control winding 20 through which the collector current from the output transistor Q5 flows and the other winding is constantly powered by a sine wave power line through a capacitor C7 which shifts the phase of the current through the line winding by 90° compared to the line voltage. The supply source PS5 for the control winding consists of a full wave rectified sine wave in phase with the line voltage. The servomotor shaft will not rotate if current only flows in the line winding. A current must flow in the control winding before any rotation may take place. The speed of rotation is governed by the magnitude of the current in the control winding and the direction of rotation is determined by whether the control current leads or lags the current in the line winding.

The utilization of the output of the chopper circuit portion of the invention to drive a servomotor may be accomplished utilizing presently known techniques, that is, without using the motor drive stage of the circuit arrangement of FIG. 1. The invention is not limited to the utilization of the specific motor drive stage illustrated and contrarily, the motor drive stage may be utilized with other chopper arrangements. The combination of the chopper circuit and the motor drive circuit, however, provides a servomotor control circuit superior to any other known servomotor drive arrangement.

While the invention has been described with a certain degree of particularity it is manifest that many changes may be made in the details of construction and the arrangement of components without departing from the spirit and scope of this disclosure. It is understood that this invention is not limited to the specific embodiment set forth herein but is to be limited only by the scope of the attached claim or claims, including the full range of equivalency to which each element or step thereof is entitled.

What is claimed:

1. A control circuit for driving a servomotor comprising:
   a chopper circuit providing regularly reoccurring square wave voltage pulses of constant frequency and selectable voltage level, said square wave voltage pulses including spike voltage signals imposed thereon;
   time complement spike signal generating circuit means providing a spike voltage signal of equivalent amplitude and of opposite phase:
   means summing said chopper circuit square wave voltage pulses and said time complement spike voltage signal to provide a chopper square wave voltage signal output of variable amplitude and substantially free of spike components;
   an amplifier having an input and an output, the input being connected to said summing means for amplifying the output of said chopper circuit summing means;
   a motor drive circuit having an input and an output, the input being connected to said amplifier output and the output being connectable to a servomotor;
   wherein said chopper circuit includes a transistor having a gate electrode and having a drain and a source electrode in series with a load resistor and a DC voltage source; and
   wherein said time complement spike signal generating means includes a first and second square wave generating transistor connected in paralleled differential arrangement and including a single emitter follower resistor, the base of said second transistor being connected to a fixed voltage potential and the base of the first transistor being connected to a square wave signal source, the output of the first transistor being connected to drive said chopper circuit, and the output of the second transistor being connected to the output of said chopper circuit wherein the outputs of said chopper circuit and said second transistor are summated.

2. A chopper circuit for driving a servomotor according to claim 1 wherein said chopper circuit and said summing means comprises:
   a field effect transistor having a drain electrode, a source electrode, and a gate electrode;
   a DC voltage source connected between said drain and source electrodes;
   a load resistor in series with and between said DC voltage source and one of said drain and source electrodes;
   circuit means imposing a driving square wave voltage signal on said gate electrode, said square wave voltage signal serving to alternately cause said transistor to conduct and cut off, the output of the chopper circuit being taken between said load resistor and said drain electrode;
   circuit means imposing a spike canceling square wave voltage signal on the one of said drain and source electrodes connected to said load resistor, the spike canceling square wave voltage signal being a time complement of said driving square wave voltage signal;
   wherein said circuit means imposing said driving signal and said spike canceling signal comprises:
   a first and a second paralleled square wave generating transistor each having a collector electrode, an emitter electrode, and a base electrode;
   paralleled emitter follower resistors, there being one in series with the emitter electrode of each of said square wave generating transistors, the paralled emitter follower resistors being connected to a first circuit common point;
   a series emitter follower resistor between said circuit common point and ground;
   paralleled collector load resistors, there being one in series with the collector electrode of each of said square wave generating transistors, the paralleled collector load resistors each being connected to a second circuit common point;
   a voltage source connected between ground and said second circuit common point;
   means imparting a square wave signal on said base electrode of said first square wave generating the base electrode of said second square wave generating transistors being connected to a DC voltage potential, said driving signal being taken between said collector electrode of said first transistor and said collector load resistor in series therewith, and said spike canceling signal being taken between said collector electrode of said second transistor and said collector load resistor in series therewith.

3. A chopper circuit for driving a servomotor according to claim 2 wherein said means imparting a square wave signal on said first square wave generating transistor base electrode includes:
   a signal generating transistor having a collector electrode, a grounded emitter electrode, and a base electrode;
   a diode connected between ground and said signal generating transistor base electrode and ground;
   a resistor between said signal generating transistor base electrode and an alternating sine wave signal source; and
   a first and second seriesed load resistor between said signal generating transistor collector and a DC voltage source, said base of said first square wave generating transistor being connected between the first and second seriesed load resistors.

* * * * *